United States Patent
Zhao et al.

(10) Patent No.: US 8,384,786 B2
(45) Date of Patent: Feb. 26, 2013

(54) METHOD FOR COMPENSATING FOR VIBRATION AND IMAGING APPARATUS USING THE SAME

(75) Inventors: Liefeng Zhao, Gyeonggi-do (KR); Jang-hoon Yoo, Seoul (KR)

(73) Assignee: Samsung Electronics Co., Ltd (KR)

( * ) Notice: Subject to any disclaimer, the term of this patent is extended or adjusted under 35 U.S.C. 154(b) by 290 days.

(21) Appl. No.: 12/942,332

(22) Filed: Nov. 9, 2010

(65) Prior Publication Data

US 2011/0122269 A1  May 26, 2011

(30) Foreign Application Priority Data

Nov. 26, 2009  (KR) .................. 10-2009-0115338

(51) Int. Cl.
  *H04N 5/228* (2006.01)
  *G03B 17/00* (2006.01)
(52) U.S. Cl. .................. 348/208.1; 348/208.4; 396/52
(58) Field of Classification Search .... 348/208.1–208.6, 348/208.99; 396/52–55
See application file for complete search history.

(56) References Cited

U.S. PATENT DOCUMENTS

| | | | |
|---|---|---|---|
| 7,701,484 B2 * | 4/2010 | Habe | 348/208.12 |
| 7,853,134 B2 | 12/2010 | Imamura | |
| 2007/0183765 A1 | 8/2007 | Imamura | |
| 2011/0085784 A1 | 4/2011 | Imamura | |

FOREIGN PATENT DOCUMENTS

| | | |
|---|---|---|
| JP | 2004-085790 | 3/2004 |
| JP | 2007221215 | 8/2007 |
| JP | 2008020703 | 1/2008 |
| KR | 100726256 | 6/2007 |
| KR | 1020070080223 | 8/2007 |
| KR | 1020080066221 | 7/2008 |
| KR | 1020090042594 | 4/2009 |

* cited by examiner

*Primary Examiner* — Sinh Tran
*Assistant Examiner* — Christopher K Peterson
(74) *Attorney, Agent, or Firm* — The Farrell Law Firm, P.C.

(57) ABSTRACT

A method of compensating for vibration and an imaging apparatus are provided. The method of compensating for vibration includes determining whether a vibration compensation starting condition is satisfied, and starting compensating for vibration prior to operating a shutter, if the vibration compensation starting condition is satisfied. Accordingly, a shutter lag is reduced and power consumption is reduced, and accuracy of vibration compensation is improved.

16 Claims, 5 Drawing Sheets ent Application
No. 10-2009-0115338, filed on Nov. 26, 2009, in the
METHOD FOR COMPENSATING FOR VIBRATION AND IMAGING APPARATUS USING THE SAME

PRIORITY

This application claims priority to Korean Patent Application No. 10-2009-0115338, filed on Nov. 26, 2009, in the Korean Intellectual Property Office, the disclosure of which is incorporated herein by reference in its entirety.

BACKGROUND

1. Field of the Invention

The present invention generally relates to a method of compensating for vibration and an imaging apparatus using the same, and more particularly, to a method for compensating for vibration caused by hand-shake in an imaging apparatus and an imaging apparatus using the same.

2. Description of the Related Art

Users may unavoidably experience hand-shake when taking a picture using an imaging apparatus. The hand-shake causes vibration in the imaging apparatus, thereby resulting in a blurry image and making it difficult to focus when zooming at high magnification. In addition, if an instant view function is available on a display of an imaging apparatus, it may be inconvenient to see an instant view image when an image is zoomed at high magnification.

In order to overcome such vibrations caused by hand-shake, recent imaging apparatuses have been equipped with anti-vibration systems for reducing vibration caused by hand-shake. The anti-vibration systems have the same goal but may utilize different methods for compensating for vibration.

In a related-art method for compensating for vibration, due to a long shutter lag, the user is not able to capture a desired image at a desired time and an error frequently Occurs.

Therefore, there is a demand for a method for compensating for vibration, which allows a user to capture a desired image at a desired time by reducing a shutter lag, and minimizes an error in an imaging apparatus.

SUMMARY OF THE INVENTION

An aspect of the present invention is to address at least the above-mentioned problems and/or disadvantages and to provide at least the advantages described below. Accordingly an aspect of the present invention provides a method for compensating for vibration, which starts compensating for vibration prior to operating a shutter once a vibration compensation starting condition is satisfied, and an imaging apparatus using the same.

According to an aspect of the present invention, there is provided a method of compensating for vibration in an imaging apparatus, the method including determining whether a vibration compensation starting condition is satisfied, and starting compensating for vibration prior to operating a shutter, if the vibration compensation starting condition is satisfied.

Determining whether the vibration compensation starting condition is satisfied includes determining whether the imaging apparatus is in a stable state, determining whether a first condition value, which is a product of a focal distance and an exposure time, is larger than a predetermined first threshold value, and determining whether a second condition value, which is a difference between a user average waiting time and a current waiting time, is less than a predetermined second threshold value.

Determining whether the vibration compensation starting condition is satisfied also includes calculating the user average waiting time, calculating the second condition value which is the difference between the user average waiting time and the current waiting time, comparing the second condition value with the predetermined second threshold value, and, if the second condition value is less than or equal to the second threshold value, determining that the vibration compensation starting condition is satisfied.

The method further includes, after operating the shutter, performing an auto fine exposure and an auto fine focus.

According to another aspect of the present invention, there is provided an imaging apparatus, including a shutter operator, a vibration compensator which compensates for vibration, and a controller which determines whether a vibration compensation starting condition is satisfied, and, if the vibration compensation starting condition is satisfied, controls the vibration compensator to start compensating for the vibration prior to operating the shutter operator.

The imaging apparatus further includes a movement measurement unit which measures a movement of the imaging apparatus, and if the movement of the imaging apparatus measured by the movement measurement unit is smaller than a predetermined threshold value, the controller determines that the imaging apparatus is in a stable state and determines that the vibration compensation starting condition is satisfied.

The imaging apparatus further includes a user historical measurement unit which calculates the user average waiting time, and the controller calculates the second condition value, which is the difference between the user average waiting time and the current waiting time, and, if the second condition value is less than or equal to the predetermined second threshold value as a result of comparing the second condition value and the second threshold value, the controller determines that the vibration compensation starting condition is satisfied.

Additional aspects and advantages of the present invention will be set forth in the following detailed description, will be clear from the detailed description, and may be learned by practicing the invention.

BRIEF DESCRIPTION OF THE DRAWINGS

The above and/or other aspects will be more apparent by describing embodiments of the present invention, with reference to the accompanying drawings, in which.

DETAILED DESCRIPTION OF EMBODIMENTS OF THE PRESENT INVENTION

Figure 1:
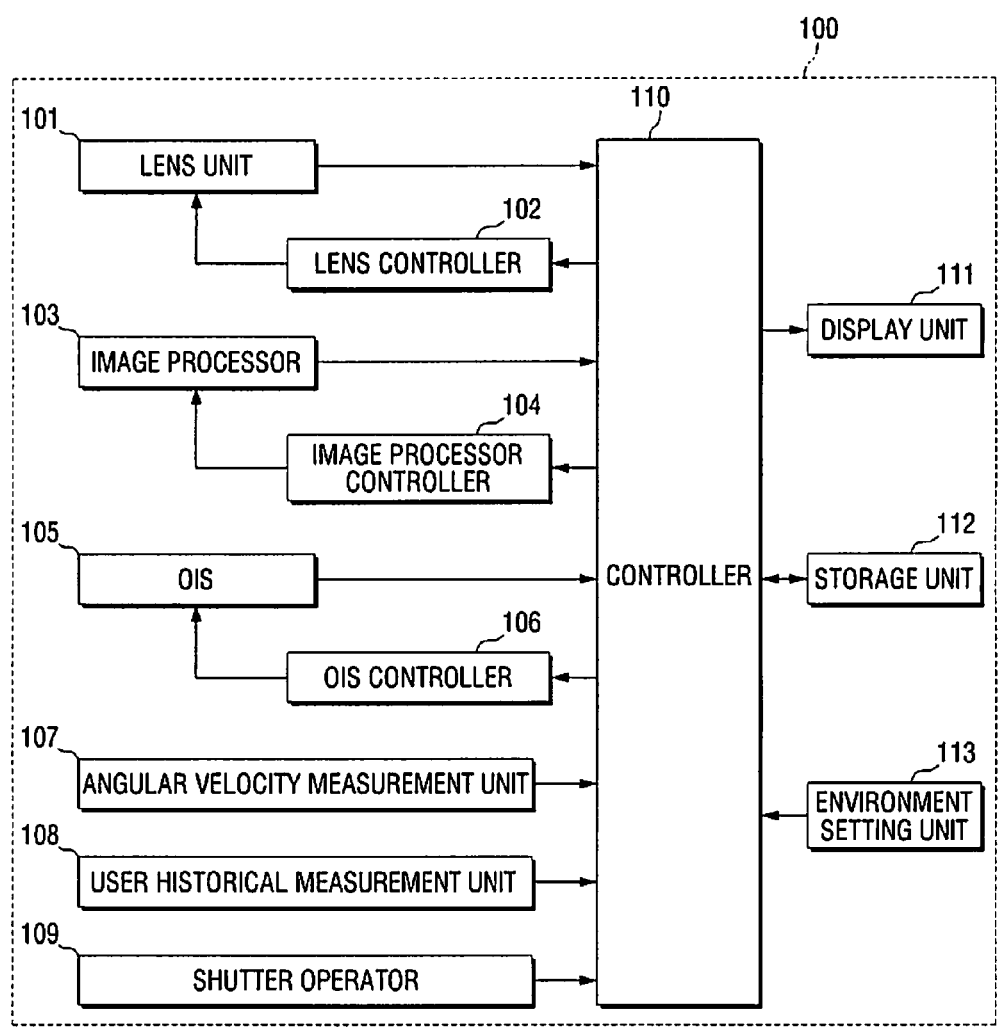
FIG. 1 is a block diagram illustrating a digital camera according to an embodiment of the present invention.

Hereinafter, embodiments will be described in greater detail with reference to the accompanying drawings.

In the following description, the same reference numerals are used for the same elements even when they are depicted in different drawings. The matters defined in the description, such as detailed construction and elements, are provided to assist in a comprehensive understanding of the present invention. Thus, it is apparent that the embodiments can be carried out without those specifically defined matters. Also, functions or elements known in the related art are not described in detail since they would obscure the invention with unnecessary detail.

FIG. 1 is a block diagram illustrating a digital camera 100 according to an embodiment of the present invention.

As shown in FIG. 1, the digital camera 100 includes a lens unit 101, a lens controller 102, an image processor 103, an optical image stabilizer (OIS) 105, an angular velocity measurement unit 107, a user historical measurement unit 108, a shutter operator 109, a controller 110, a display unit 111, a storage unit 112, and an environment setting unit 113.

The lens unit 101 includes at least one lens. Light entering through the lens unit 101 is transmitted to a surface of the image processor 103. The lens unit 101 may include a body to support and move the lens. The lens unit 101 moves the body to adjust a focal distance.

The lens controller 102 controls location of the lens based on a data value calculated by the controller 110.

The image processor 103 will be explained in detail with reference to FIG. 2.

Figure 2:
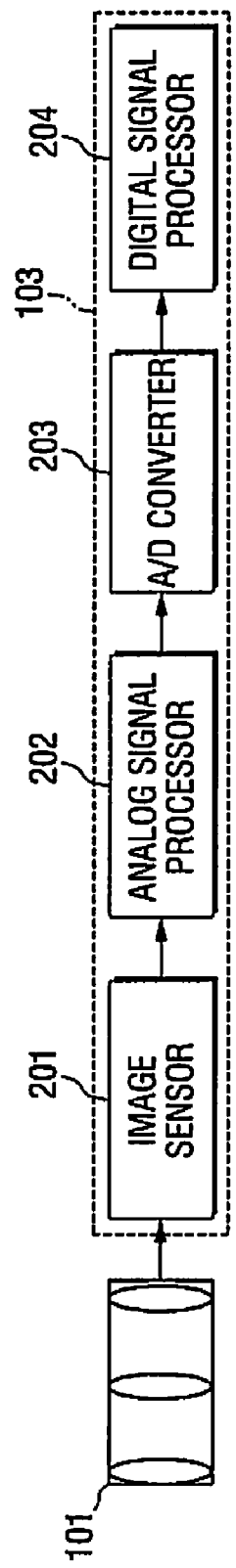
FIG. 2 is a block diagram illustrating an image processor of the digital camera of FIG. 1.

As shown in FIG. 2, the image processor 103 includes an image sensor 201, an analog signal processor 202, an A/D converter 203, and a digital signal processor 204.

The image sensor 201 may utilize a charge-coupled device (CCD) method or a complementary metal-oxide semiconductor (CMOS) method. The image sensor 201 converts incident light into an electrical signal when being exposed to the incident light.

An image processor controller 104 continuously outputs an electric charge which is accumulated by photoelectric conversion of the incident light, and accordingly, outputs an electric signal according to a timing signal generated and output under control of the controller 110.

The analog signal processor 202 receives the signal output from the image sensor 201 and processes the input signal through a correlated double sampling (CDS) process or an automatic gain control (AGC) process. The signal is output to the A/D converter 203.

The A/D converter 203 converts the input signal into a digital signal and outputs the converted digital signal to the digital signal processor 204.

The digital signal processor 204 generates image data of a format corresponding to a still image using the input digital signal. The generated image data is processed by auto exposure (AE), auto focus (AF) or auto white balance (AWB).

The OIS 105 and an OIS controller 106 perform an independent function of the digital camera 100. The OIS 105 includes a vibration compensation actuator, a location detector, and an A/D converter. The OIS controller 106 includes a D/A converter and may further include a vibration compensation driving unit in another embodiment.

The OIS 105 is connected to the lens unit 101 and the vibration compensation actuator is connected to a vibration compensation lens unit. The vibration compensation actuator includes a pitching direction actuator and a yaw direction actuator. The pitching direction actuator is for moving a vibration compensation lens forward and backward, and the yaw direction actuator is for moving the vibration compensation lens in a horizontal direction.

In another embodiment of the present invention, the OIS 105 may be connected to the image processor 103, and the vibration compensation actuator may be connected to the image sensor 201. In this embodiment, the vibration compensation actuator also includes a pitching direction actuator and a yaw direction actuator.

In still another embodiment, the OIS 105 may be connected to the image processor 103 and the vibration compensation actuator may be connected to the image sensor 201. The vibration compensation actuator may include a pitching direction actuator, a yaw direction actuator, and a rolling direction actuator. The pitching direction actuator is for moving the image sensor 201 forward and backward, the yaw direction actuator is for moving the image sensor 201 in a horizontal direction, and the rolling direction actuator is for moving the image sensor 201 in a rotation direction.

Locations of the pitching direction actuator, the yaw direction actuator and the rolling direction actuator, which are connected to the vibration compensation lens unit or the image sensor 201, are detected by a vibration compensation location detector, and a result of detection is processed by the A/D converter 203 and is output to the controller 110.

The controller 110 obtains a signal from the vibration compensation location detector and is aware of a state of the vibration compensation actuator in the pitching direction, the yaw direction, and the rolling direction. A driver of the vibration compensation actuator unit is executed by the vibration compensation driver of the OIS controller 106.

Also, the controller 110 calculates a degree of controlling movement in order for the OIS controller 106 to compensate for vibration. The degree of controlling movement is calculated based on an amount of vibration in each direction of the pitching direction, the yaw direction, and the rolling direction of an angular velocity detection signal measured by the angular velocity measurement unit 107. Also, a location state signal may be obtained by the vibration compensation location detector of the OIS 105.

Figure 3:
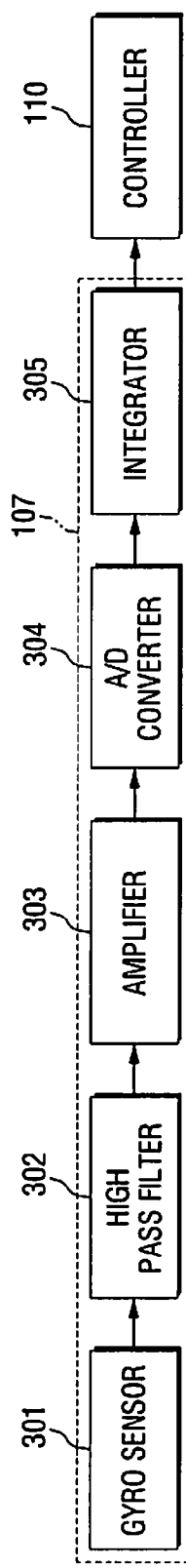
FIG. 3 is a block diagram illustrating an angular velocity measurement unit of the digital camera of FIG. 1.

As seen in FIG. 3, the angular velocity measurement unit 107 measures vibration of the digital camera 100 in the pitching direction, the yaw direction, and the rolling direction, using a gyro sensor 301, a high pass filter 302, an amplifier 303, an A/D converter 304, and an integrator 305.

Referring to FIG. 3, a method for measuring vibration in the pitching direction using the angular velocity measurement unit 107 will be explained in detail. Vibration in the yaw direction and the rolling direction may be measured in a similar method.

Vibration of a camera is detected by the gyro sensor 301. The angular velocity measurement unit 107 may be an angular velocity sensor operating in accordance with a piezoelectric element principle or may be a gyroscope using Coriolis angular velocity. The gyro sensor 301 outputs a reference voltage value of 1.5V when no angular velocity is measured. The gyro sensor 301 outputs a value larger than the reference voltage value when there is a rotation in a specific direction (positive direction) and outputs a value smaller than the reference voltage value when there is a rotation in another specific direction (negative direction).

At this time, a direct current component, which indicates a change smaller than a change in the reference voltage caused by a change in temperature or smaller than an unstable change in the reference value, for example, smaller than 0.1 HZ, should be referenced. The direct current component may be called a "drift" or something similar. General vibration of the camera caused by hand-shake may be from 1 HZ to 20 HZ. Therefore, the direct current component may be removed by allowing a detected signal to pass through the high pass filter 302. A blocking frequency of the high pass filter 302 may be set to 0.1 HZ. The signal passing through the high pass filter 302 is input to the amplifier 303.

The amplifier 303 amplifies the input detection signal. In order to obtain a high degree of accuracy, the amplifier 303 may be set to have a high amplification constant. The detection signal amplified by the amplifier 303 is converted into a digital signal by the A/D converter 304 and output to the integrator 305.

The integrator 305 converts an angular velocity signal into an angle movement value. The integrator 305 may be an analog circuit or may be operated digitally by the controller 110. By measuring the angle movement value, the controller 110 determines whether or not the camera has moved, and if the camera has moved, the controller determines how much the camera has moved. If the digital camera 100 is set to a vibration compensation mode (OIS_ON=1), the angle movement value is transmitted to the OIS controller 106 under the control of the controller 100. In order to compensate for the movement of an image caused by the vibration of the camera occurring at predetermined time intervals, the vibration compensation actuator of the OIS 105 is moved to a predetermined location.

The user historical measurement unit 108 measures a user's habit when the user takes a picture using the digital camera 100. For example, the user historical measurement unit 108 measures a time period during which the digital camera 100 is in a stable state until the user takes a picture. A measured value is processed into data and the data is used so that the vibration can be compensated for effectively. Therefore, unnecessary power consumption of the digital camera 100 can be prevented.

In another embodiment, the user historical measurement unit 108 measures information about vibration of the digital camera 100 when the user takes a picture. The vibration information of the digital camera 100 may include the number of vibrations and the amplitude of vibration.

However, different users have different habits. Therefore, the controller 110 controls the storage unit 112 to store data relating to users' diverse habits for vibration compensation. The controller 110 compensates for vibration in a manner suitable for each user based on the pre-stored data. The accuracy of vibration compensation can be improved.

The shutter operator 109 is an input unit through which a user's manipulation to operate a shutter is input. More specifically, the shutter operator 109 may include a shutter button or may be realized as any other type of operating device. The shutter operator 109 may be in either an S1 state or an S2 state. In the S1 state, the shutter button is not completely pressed and is pressed in part, and in the S2 state, the shutter button is completely pressed.

The display unit 111 may display an image photographed by the digital camera 100 on a real time basis, and also may display an environment setting of the digital camera 100.

The storage unit 112 may store the image photographed by the digital camera 100, the environment setting information of the digital camera 100, and program information of the controller 110. The storage unit 112 may be realized as a random access memory (RAM), a read only memory (ROM), a non-volatile memory, a processor register, or a combination of the aforementioned memories.

The user may input the environment setting of the digital camera 100 through the environment setting unit 113. For example, the user may input controllable parameters such as a focal distance, an exposure time, an F number, and an OIS state through the environment setting unit 113.

Hereinafter, a method for compensating for vibration according to an embodiment of the present invention will be explained with reference to FIGS. 4 and 5.

Figure 4:
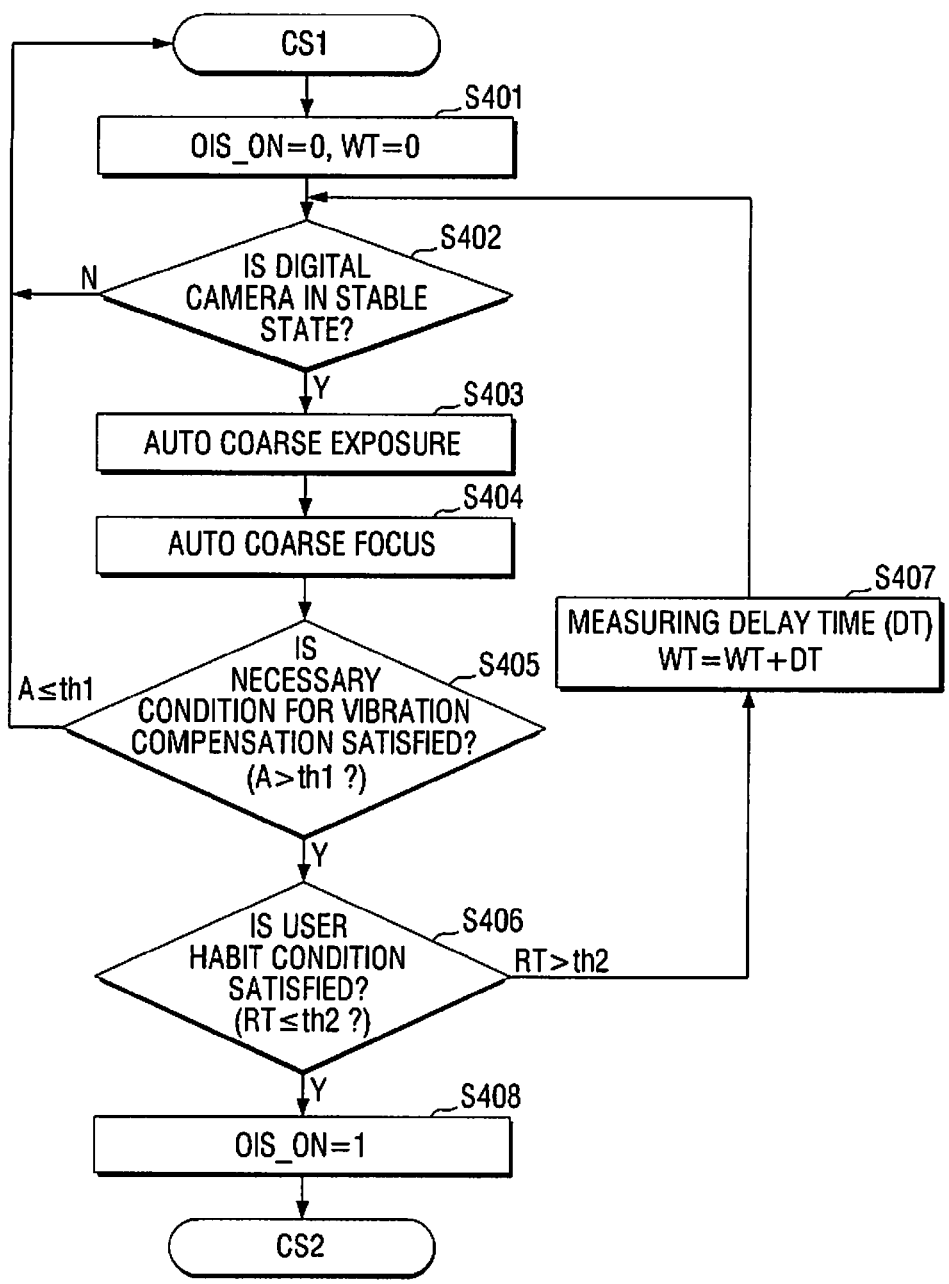
FIGS. 4 and 5 are flowcharts illustrating a method for compensating for vibration according to an embodiment of the present invention.

Referring to FIG. 4, in step 401 the digital camera 100 starts to operate when it is turned on. In this operation, all of the elements are powered-on but the angular velocity measurement unit 107 is not immediately driven. This state is referred to as a "CS1" state. In this state, vibration is not compensated for. As shown in FIG. 4, this state may be expressed by OIS_ON=0. In the OIS_ON=0 state, the angular velocity measurement unit 107 does not send an angular velocity signal, the OIS 105 does not send location information of the actuator to the controller 110, and the controller 110 does not drive the actuator. In this state, a waiting time (WT) is set to "0".

After a predetermined time elapses, it is determined whether the digital camera 100 is in a stable state in step S402. Determining whether the digital camera 100 is in the stable state is performed by the controller 110. If no movement is detected from the digital camera 100 or if detected movement is less than a predetermined value, as a result of measuring an angular velocity by the angular velocity measurement unit 107, the controller 110 determines that the digital camera 100 is in the stable state. However, if detected movement is greater than the predetermined value, the controller 110 determines that the digital camera 100 is in an unstable state.

If it is determined that the digital camera 100 is in the unstable state, the digital camera 100 is controlled to return to the CS1 state at step S402-N.

However, if it is determined that the digital camera 100 is in the stable state at step S402-Y, the digital camera 100 performs an auto coarse exposure function based on a low-quality image in step S403. The controller 110 calculates an F number and an exposure time based on the low-quality image by performing the auto coarse exposure function.

Also, the digital camera 100 performs an auto coarse focus function based on the low-quality image after performing the auto coarse exposure function in step S404. The controller 110 calculates a focal distance based on the low-quality image by performing the auto coarse exposure function. The digital camera 100 determines whether it is necessary to compensate for vibration after performing the auto coarse focus function in step S405. That is, the controller 110 determines whether a necessary condition for compensating for vibration is satisfied. The necessary condition for compensating for vibration is determined based on a first condition value which is the product of the exposure time and the focal distance obtained in the auto coarse exposure process at step S403 and the auto coarse focus process at step S404, respectively. That is, the first condition value is expressed by Equation 1:

$$\text{first condition value }(A)=\text{focal distance}*\text{exposure time}$$

More specifically, the controller 110 calculates the first condition value "A" which is the product of the exposure time obtained by the auto coarse exposure process at step S403 and the focal distance obtained by the auto coarse focus process at step S404. Also, the controller 110 compares the first condition value "A" with a predetermined first threshold value "th1". The first threshold value "th1" may be set during manufacture or may be set by the user.

If the first condition value "A' is less than or equal to the first threshold value "th1" at step S405-N, the controller 110 determines that it is not necessary to compensate for vibration. Therefore, the digital camera 100 returns to the CS1 state. If the first condition value "A" is larger than the first threshold value "th1" at step S405-Y, the controller 100 determines that it is necessary to compensate for vibration.

If it is determined that it is necessary to compensate for vibration, the digital camera 100 determines whether the vibration compensation condition indicated by the user's habit is satisfied in step S406. The user's habit indicates how long it takes for the user to take a picture. More specifically, the user's habit refers to an average waiting time during which the digital camera 100 is in the stable state until the shutter is pressed. The average waiting time is measured by the user historical measurement unit 108 and is stored in the storage unit 112. The average waiting time may be stored in the storage unit 112 as diverse time variables according to other conditions besides the focal distance and the exposure time. For example, if the focal distance is 0.1 mm and the exposure time is 0.1 second, the average waiting time is stored in the storage unit 112 as time "t1", and if the focal distance is 0.2 mm and the exposure time is 0.2 second, the average waiting time is stored in the storage unit 112 as time "t2". The controller 110 calculates a second condition value "RT" by subtracting a current waiting time (WT) from the average waiting time measured by the user historical measurement unit 108. That is, the second condition value "RT" may be expressed by Equation 2:

second condition value (RT)=average waiting time–current waiting time (WT)

The controller 110 compares the calculated second condition value "RT" with a predetermined second threshold value "th2". The second threshold value "th2" may be set during manufacture or may be set by the user.

If the second condition value "RT" is larger than the second threshold value "th1" at step S406-N, the controller 110 determines that it is not necessary to compensate for vibration. The digital camera 100 does not compensate for vibration and measures a delay time "DT". The delay time "DT" is added to the waiting time "WT" in step S407 and the process returns to step S402. If the second condition value "RT" of the digital camera 100 is less than or equal to the second threshold value "th2" in step S406-Y, the controller 110 determines that it is necessary to compensate for vibration.

By determining whether it is necessary to compensate for vibration based on the user's habit, unnecessary power consumption can be avoided because it is determined whether the user is going to take a picture before it is determined whether it is necessary compensate for vibration.

As shown in FIG. 4, if it is determined that it is necessary to compensate for vibration, the digital camera 100 enters the OIS_ON=1 state in step S408. In the OIS_ON=1 state, the angular velocity measurement unit 107 measures movement of the digital camera 100 and transmits an angular velocity signal to the controller 110, and OIS 105 also transmits location information of the actuator to the controller 110, such that the controller 110 drives the actuator.

At this time, the digital camera 100 enters a CS2 state. In the CS2 state, the digital camera 100 starts compensating for vibration.

Figure 5:
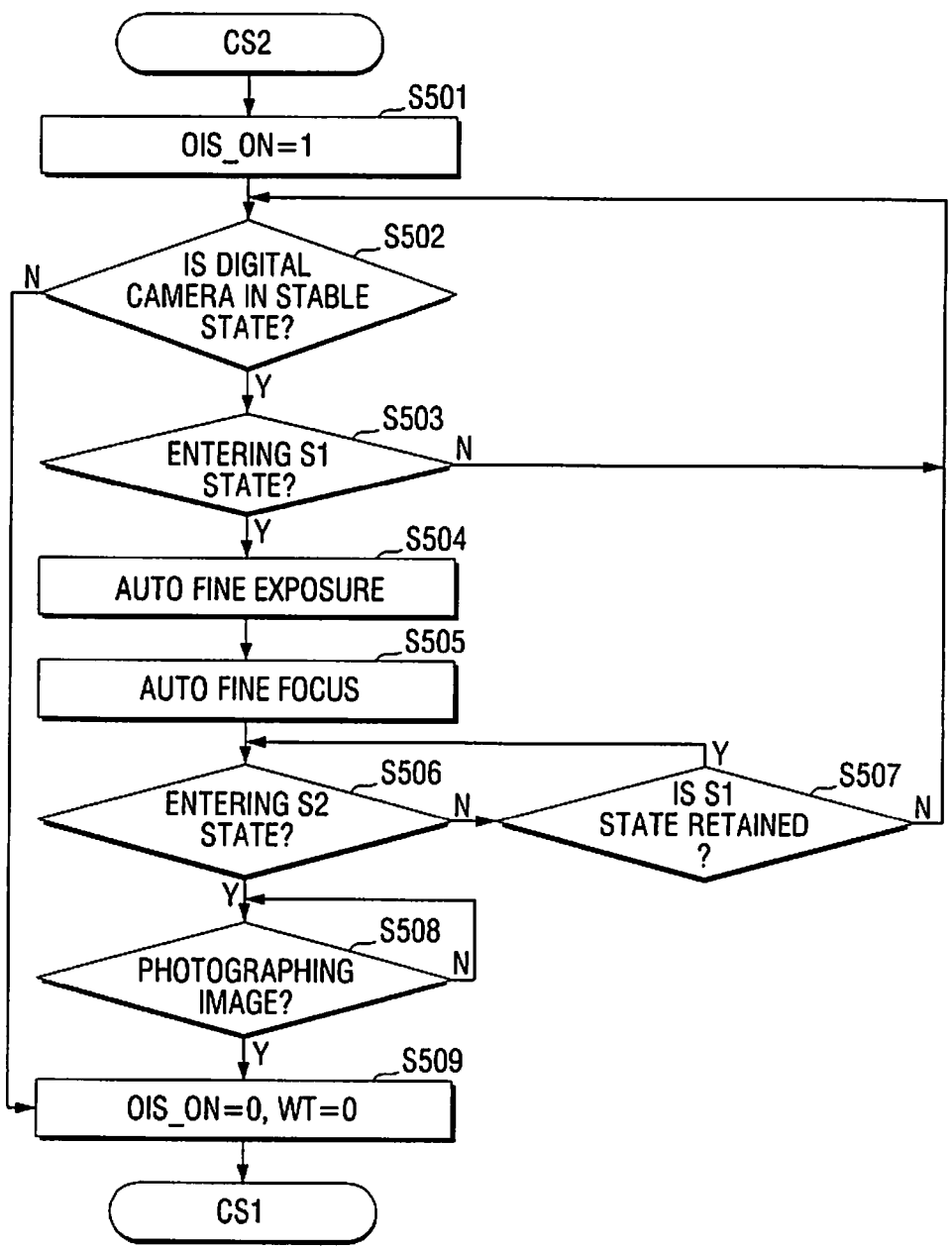

FIG. 5 is a flowchart illustrating operations after operation in the CS2 state. As described above, in the CS2 state, the digital camera 100 enters the OIS_ON=1 state in step S501.

In the OIS_ON=1 state, the controller 110 re-determines whether the digital camera 100 is in the stable state in step S502. A method for determining whether the digital camera 100 is in the stable state is the same as that in step S402 described above.

If it is determined that the digital camera 100 is not in the stable state at step S502-N, the OIS_ON value is 0 and the digital camera 100 returns to the CSI state in step S509.

If it is determined that the digital camera 100 is in the stable state at step S502-Y, it is determined whether the shutter button is pressed in step S503. If it is determined that the shutter operator 109 is not in the S1 state at step S503-N, the digital camera 100 returns to step S502.

If it is determined that the shutter operator 109 is in the S1 state at step S503-Y, the digital camera 100 performs an auto fine exposure function based on a high-quality image in step S504, and then performs an auto fine focus function in step S505. Through the auto fine exposure process in step S504, the controller 110 calculates an F number and an exposure time based on the high-quality image. Also, through the auto fine focus process in step S505, the controller 110 calculates a focal distance based on the high-quality image.

As described above, if the vibration is compensated for prior to the auto fine exposure process and the auto fine focus process, the accuracy of the auto fine exposure function and the auto fine focus function can be improved and thus a high-quality image can be obtained. Also, a shutter lag can be reduced since it takes less time to perform the auto fine exposure function and the auto fine focus function. The shutter lag refers to a time period of the S1 state before the start of the exposure.

After the auto fine exposure function and the auto fine focus function are performed, it is determined whether the shutter operator 109 is in the S2 state or not in step S506.

If the shutter operator 109 is in the S2 state at step S506-Y, the image sensor 201 is exposed to the light and an image is photographed in step S508. However, if the shutter operator 109 is not in the S2 state at step S506-N, it is determined whether the S1 state continues in step S507. If the S1 state is retained, the digital camera 100 waits until it enters the S2 state, and if the S1 state is not retained, the digital camera 100 returns to step S502.

If the image is photographed, the digital camera 100 enters the OIS_ON=0 state and the waiting time (WT) value is 0 in step S509. Accordingly, the digital camera 100 returns to the CS1 state.

In the above embodiment, the imaging apparatus is digital camera 100. However, this is merely an example and any other type of imaging apparatus such as a camcorder may be replaced for the digital camera 100.

Also, in the above embodiment, the angular velocity measurement unit 107 is used as a movement measurement unit. However, this is merely an example and any other type of movement measurement unit may be replaced for the angular velocity measurement unit 107.

According to the above embodiment, if a vibration compensation starting condition is satisfied, the vibration is compensated for prior to operating of the shutter. Accordingly, since the shutter is operated after the vibration has been completely compensated, a shutter lag can be reduced and thus it is possible to capture a desired image rapidly and an error can be prevented. Also, since the vibration compensation starts before the shutter is operated and the auto focus and the auto exposure are performed after the shutter is operated, the power consumption can be minimized. Also, since there is sufficient time to compensate for vibration, the accuracy of the vibration compensation can be improved.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method of compensating for vibration in an imaging apparatus, the method comprising:
   determining whether a vibration compensation starting condition is satisfied or not;
   starting compensating for vibration prior to operating a shutter, if the vibration compensation starting condition is satisfied and;

wherein determining whether the vibration compensation starting condition is satisfied comprises determining whether the imaging apparatus is in a stable state, determining whether a first condition value, which is a product of a focal distance and an exposure time, is greater than a predetermined first threshold value, and determining whether a second condition value, which is a difference between a user average waiting time and a current waiting time, is less than or equal to a predetermined second threshold value.

2. The method as claimed in claim 1, wherein determining whether the imaging apparatus is in the stable state comprises: detecting a movement of the imaging apparatus; and if the movement of the imaging apparatus is detected to be less than a predetermined third threshold value, determining that the imaging apparatus is in the stable state.

3. The method as claimed in claim 1, wherein determining whether the first condition value is greater than the predetermined first threshold value, comprises: measuring the focal distance and the exposure time of the imaging apparatus; calculating the first condition value, which is the product of the focal distance and the exposure time; comparing the first condition value with the predetermined first threshold value; and if the first condition value is greater than the predetermined first threshold value, determining that the vibration compensation starting condition is satisfied.

4. The method as claimed in claim 1, wherein determining whether the vibration compensation starting condition is satisfied, comprises: calculating the user average waiting time; calculating the second condition value which is the difference between the user average waiting time and the current waiting time; comparing the second condition value with the predetermined second threshold value; and if the second condition value is less than or equal to the predetermined second threshold value, determining that the vibration compensation starting condition is satisfied.

5. The method as claimed in claim 1, wherein the waiting time is a time period during which the imaging apparatus is in the stable state until the shutter is operated.

6. The method as claimed in claim 1, wherein the user average waiting time is calculated according to a photographing condition of the imaging apparatus comprising the focal distance and the exposure time.

7. The method as claimed in claim 1, further comprising, after operating the shutter, performing an auto fine exposure function and an auto fine focus function.

8. The method as claimed in claim 1, wherein the imaging apparatus is a digital camera.

9. An imaging apparatus, comprising:
a shutter operator;
a vibration compensator which compensates for vibration; and
a controller which determines whether a vibration compensation starting condition is satisfied, and if the vibration compensation starting condition is satisfied, controls the vibration compensator to start compensating for the vibration prior to operating the shutter operator; and
wherein the vibration compensation starting condition comprises a condition indicating whether the imaging apparatus is in a stable state, a condition indicating whether a first condition value, which is a product of a focal distance and an exposure time, is greater than a predetermined first threshold value, and a condition indicating whether a second condition value, which is a difference between a user average waiting time and a current waiting time, is less than or equal to a predetermined second threshold value.

10. The imaging apparatus as claimed in claim 9, further comprising a movement measurement unit which measures a movement of the imaging apparatus, wherein, if the movement of the imaging apparatus measured by the movement measurement unit is less than a predetermined third threshold value the controller determines that the imaging apparatus is in the stable state and determines that the vibration compensation starting condition is satisfied.

11. The imaging apparatus as claimed in claim 9, wherein the controller measures the exposure time and the focal distance and calculates the first condition value, which is the product of the focal distance and the exposure time, and if the calculated first condition value is greater than the predetermined first threshold value as a result of comparing the first condition value and the first threshold value, the controller determines that the vibration compensation starting condition is satisfied.

12. The imaging apparatus as claimed in claim 9, further comprising a user historical measurement unit which calculates the user average waiting time, wherein the controller calculates the second condition value, which is the difference between the user average waiting time and the current waiting time, and if the second condition value is less than or equal to the predetermined second threshold value as a result of comparing the second condition value and the predetermined second threshold value, the controller determines that the vibration compensation starting condition is satisfied.

13. The imaging apparatus as claimed in claim 9, wherein the waiting time is a time period during which the imaging apparatus is in the stable state until the shutter operator is operated.

14. The imaging apparatus as claimed in claim 9, wherein the user average waiting time is calculated according to a photographing condition of the imaging apparatus comprising the focal distance and the exposure time.

15. The imaging apparatus as claimed in claim 9, wherein the controller performs an auto fine exposure function and an auto fine focus function after operating the shutter operator.

16. The imaging apparatus as claimed in claim 9, wherein the imaging apparatus is a digital camera.

* * * * *